June 22, 1943.    M. W. HUBER    2,322,518
COMBINED BRAKE AND SELECTOR VALVE
Filed June 1, 1942    4 Sheets-Sheet 1

Inventor
Matthew W. Huber
By Dodge and Imm
Attorneys

June 22, 1943.   M. W. HUBER   2,322,518
COMBINED BRAKE AND SELECTOR VALVE
Filed June 1, 1942   4 Sheets-Sheet 2

Inventor
Matthew W. Huber

Attorneys

June 22, 1943.   M. W. HUBER   2,322,518
COMBINED BRAKE AND SELECTOR VALVE
Filed June 1, 1942   4 Sheets-Sheet 3

VENTING LOW

LAP

REVERSE

Inventor
Matthew W. Huber
By
Dodge and Inn
Attorneys

June 22, 1943.  M. W. HUBER  2,322,518
COMBINED BRAKE AND SELECTOR VALVE
Filed June 1, 1942  4 Sheets-Sheet 4

Inventor
Matthew W. Huber
By
Dodge and Imm
Attorneys

Patented June 22, 1943

2,322,518

UNITED STATES PATENT OFFICE 2,322,518

COMBINED BRAKE AND SELECTOR VALVE

Matthew W. Huber, Chicago, Ill., assignor to Hydraulic Controls, Inc., a corporation of Illinois Application June 1, 1942, Serial No. 445,335

6 Claims. (Cl. 303—52)

This invention relates to a manually operable controlling valve intended for use in hydraulic systems operated at relatively high pressures, say pressures of the order of 2500 lbs. per sq. in. The valve comprises in a single structure a self-lapping brake valve and a distributing valve for controlling pressure in a plurality of motors. Certain features of construction are dictated by the high pressures used and an important feature of the valve is that a self-lapping brake valve is controlled by secondary manipulation of the actuator which controls the distributing valve. While the valve might be applied to a number of uses, its operative characteristics can be explained more simply by describing a commercial use of the valve.

In certain tractor units of the track laying type and of considerable power and weight, use is made of a transmission which has three gear changing shifts. One of these establishes a low speed drive; another a high speed drive, and the third a reverse drive. These three shifts are operated by individual hydraulic motors.

The energization of any motor by the admission of hydraulic fluid thereto establishes the corresponding drive. A return spring dis-establishes the drive by returning the motor to its neutral position upon venting thereof. The distributing valve can be set to energize selected ones of these three motors or to vent the motor so energized. Between the admission positions for the various motors are lap positions in which all ports are closed.

As an incident to the operation of the three shifting motors above mentioned, it is at times desirable to retard motion of a component of the transmission and this retardation is effected by a friction brake which is operated by a fourth motor hereinafter called the "brake cylinder." The self-lapping brake valve establishes and graduates the pressure in this brake cylinder.

The selector valve mechanism which controls the energization of the shift motors is operated by swinging a radial handle. The self-lapping valve may be operated in any position of the handle by twisting the handle about its axis. This gives a one hand independent control of the distributor valve and of the self-lapping brake valve.

A high pressure hydraulic valve to perform these various selective functions presents substantial problems. The valve must operate freely in all positions, which entails the need for good hydraulic balance in all positions. It must be fitted closely to keep leakage to a minimum. Some leakage being inevitable, there must be provision to collect leakage and restore it to the system.

Accordingly, means are provided to collect and drain away any leakage of pressure fluid which may occur. This leakage removal drain arrangement is associated directly with the balancing means which relieve the rotary distributing valve from hydraulic load in the direction of its axis.

In a rotary valve devoid of special packing, the fit of the valve surfaces is a matter of vital consideration. A feature of the present invention is the use, throughout, of simple cylindrical surfaces wherever seals against the hydraulic pressure are produced. This makes it possible to secure precise cylindrical surfaces by the comparatively inexpensive method of grinding and lapping on centerless machines.

The device in commercial use has demonstrated remarkable freedom from leakage; satisfactory drainage of such slight leakage as occurs so that the exterior of the valve is clean; precise distribution characteristics, and highly satisfactory graduating characteristics of the self-lapping valve. Withal, the distributing valve is so nicely balanced that it operates freely in all positions.

In the drawings and in the following description, the details of the shift motors and the brake motor will be omitted. They are ordinary single acting piston motors with return springs and they are not essential parts of the device because the valve can be used to control the supply and exhaust of pressure fluid to and from a wide variety of devices. However, as a convenient way of distinguishing the connections they will be differentiated as the supply connection, that is the high pressure hydraulic fluid connection; the sump connection, that is the drain connection to a reservoir for hydraulic fluid not under pressure; the brake cylinder connection; the high speed connection; the low speed connection; and the reverse connection. These terms are used merely as a convenient way of differentiating connections which are similar in general appearance, and imply no functional limitations.

Figure 1:
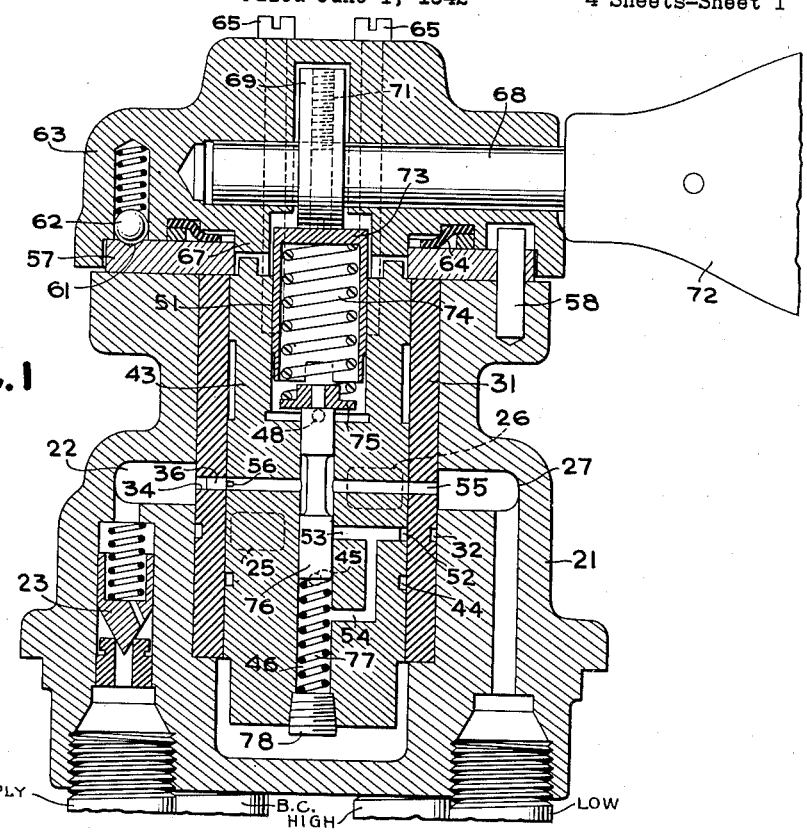
Fig. 1 is a veratical axial section of the valve mechanism with the selector valve in position to put the low speed connection under pressure; and with the self-lapping valve in position to release pressure from the brake cylinder connection. The plane of section is indicated by the line 1—1 in Fig. 4.

The valve housing comprises a casting 21. This has in its base six symmetrically arranged pipe-threaded connections to which the pipe connections with the supply, the sump, the brake cylinder, and the high, low and reverse motors, are made. Five of the six pipes leading to these connections appear in Figs. 1 and 3 and are there indicated by the legends "supply," "sump," "BC" (brake cylinder,) "high" and "low." The reverse connection is forward to the plane of section in both views but if visible would be immediately forward of the high connection on Figure 1. These connections lead to chambers which surround the valve seat bushing 31 hereinafter described and communicate with ports therein.

The chambers are all visible in Figs. 4 to 7 inclusive. Chamber 22 (see Figs. 1 and 3) is the high pressure supply chamber. A spring loaded check valve 23 (Fig. 1) prevents back flow from this chamber. The sump chamber is shown in dotted lines at 24 on Fig. 3 and is at a lower elevation than the chamber 22. The brake cylinder chamber appears in dotted lines at 25 in Figs. 1 and 3 and is at a height intermediate those of the sump chamber 24 and the supply chamber 22. The high pressure chamber appears in dotted lines at 26 in Fig. 1. The low pressure chamber is at 27 in Fig. 1, while the reverse chamber is not visible in Figs. 1 and 3 but its position is indicated at 28 in Figs. 4 to 7 inclusive.

Figure 3:
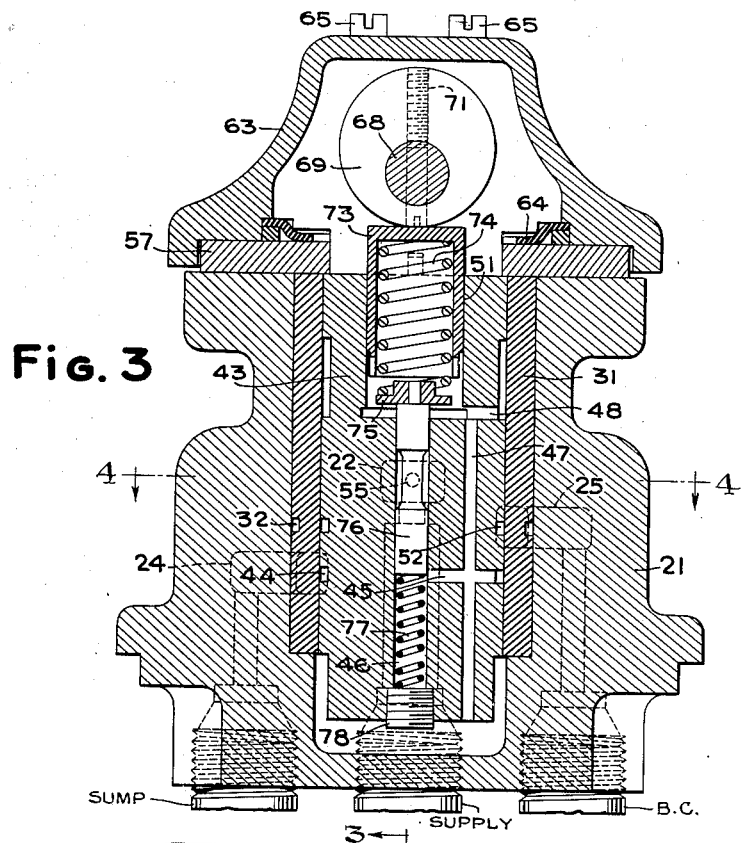
Fig. 3 is a vertical axial section of the valve in the same position as illustrated in Fig. 1, the plane of section being on the line 3—3 of Fig. 4.
Figure 4:
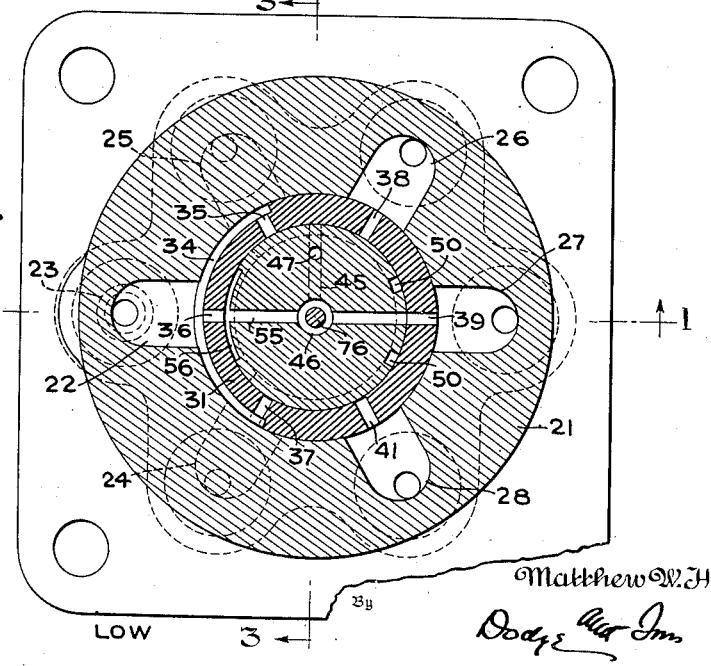
Fig. 4 is a section on the line 4—4 of Fig. 3, showing the selector valve in position to put the low speed connection under pressure.
Figure 5:
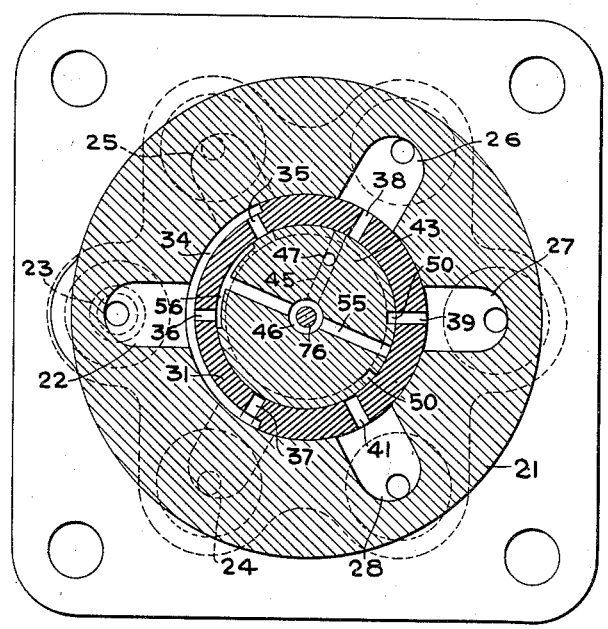
Fig. 5 is a similar view showing the valve in one of the two possible positions used to vent the low speed connection.

The chambers 22, 26, 27 and 28 are all at the same height, that is, they are all cut by the plane of the line 4—4 on Fig. 3. The chamber 25 is below this level and the chamber 24 is still lower (see Fig. 3).

Figure 12:
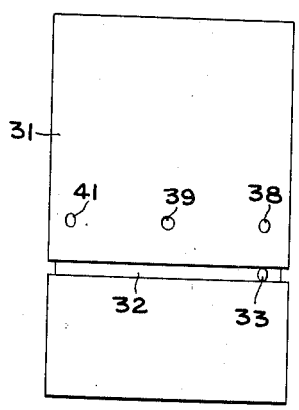
Figs. 12 and 13 are elevations at opposite sides of the bushing which serves as the valve seat within which the rotary distributing valve shown in Figs. 8 and 9 is mounted.
Figure 13:
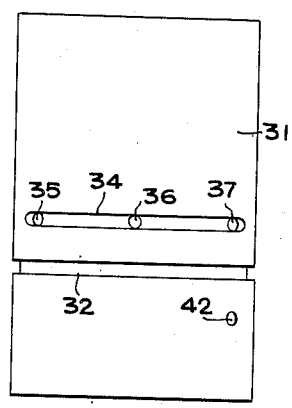
Figure 14:
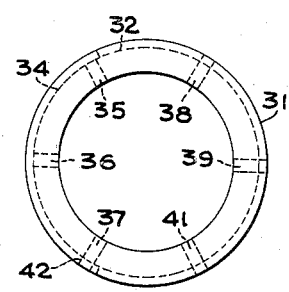
Fig. 14 is a plan view of this bushing.

The casting 21 is bored from the top to receive the valve seat bushing 31 which is pressed to place and whose form is best shown in Figs. 12 to 14 inclusive. This bushing is a plain cylindrical bushing except that it has an external groove 32 which completely encircles it at an elevation to communicate with the brake cylinder chamber 25. Communicating with this groove is the brake cylinder port 33. Above this is a second external groove 34 which subtends an angle of approximately 120° and is so arranged that it communicates at its mid-length with the supply chamber 22 (see Figs. 4 to 7).

Drilled through the bushing 31 and communicating with the groove 34 are three through ports 35, 36 and 37 and at the same height as these ports but on the opposite side of the bushing are three through ports 38, 39 and 41. Of these, 38 communicates with high speed chamber 26, 39 communicates with low speed chamber 27, and 41 communicates with reverse chamber 28 when the bushing is in place. Below the groove 32 is a through port 42 which communicates with the sump chamber 24.

Comparison of Fig. 14 with Figs. 12 and 13 will indicate that in Fig. 14 the port 42 is immediately below the port 37 and the port 33 is immediately below the port 38.

Rotatable in the bushing 31 is the cylindrical distributing valve 43, best shown in Figs. 8 to 11, inclusive. This valve has a circumferential groove 44 which is always in communication with the sump port 42 in the bushing and consequently always at sump pressure.

Communicating with the groove 44 is a radial exhaust port 45 which leads from the central bore 46 of the valve. The bore 46 serves as a seat for the self-lapping brake valve hereinafter described. Communicating with the radial port 45 is a longitudinal port 47 which is open through the lower end of the valve 43 and which is open at its upper end through a radial port 48 both to the peripheral groove 49 and to the counterbore 51 which receives the loading spring assembly for the self-lapping brake valve. Extending downward from the groove 49 are two exhaust ports 50. These take the form of grooves which extend from the groove 49 downward far enough to engage the ports 38, 39 and 41.

Above the groove 44 is a second groove 52 which subtends about 270° of the circumference of the valve. This groove 52 is located so as to engage the brake cylinder port 33 in all positions assumed by the valve 43.

Leading inward from the groove 52 is a radial port 53 which serves as the brake cylinder port for the self-lapping valve. Extension 54 of the port 53 enters the bore 46 below the lowest position reached by the lower end of the self-lapping valve and is the means used to load that valve with brake cylinder pressure and thus render it self-lapping.

Figure 9:
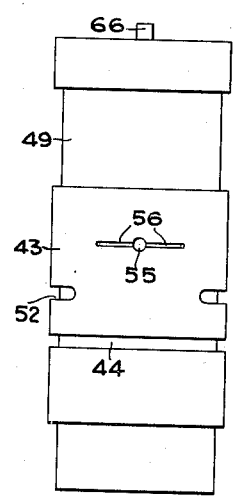
Figure 10:
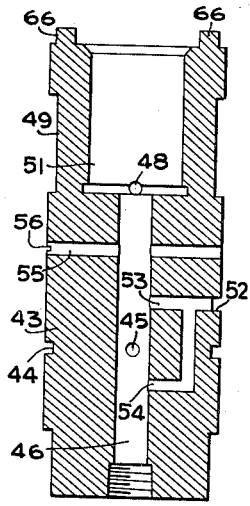
Figs. 10 and 11 are sections through this valve on the same planes as those characteristic of Figs. 1 and 3, respectively.
Figure 11:
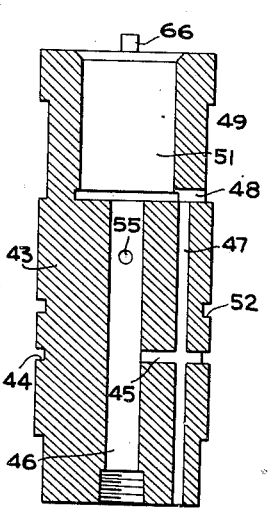

A cross port 55 is drilled through the valve 43 at such a height that it will engage the supply ports 35, 36 and 37 and also the high speed port 38, low speed port 39 and reverse port 41. As indicated in Fig. 9 the entrance end of port 55 is centered above the gap between the ends of the groove 52 and at the entrance end is provided with lateral groove extensions 56 which reach in both directions so that in all positions of the rotary valve the entrance end of port 55 is connected with the supply chamber 22. The outlet end of the port 55 is located in the interval between the exhaust groove ports 50 (see Fig. 8).

It will be observed that the space below the lower end and the space above the upper end of the valve 43 are each at sump pressure because they connect directly with the sump port 47.

Seated on the top of the valve body 21 is an annular plate 57 which is definitely positioned by a stake 58 pressed into the body and engaging an opening in the plate 57. This plate is held down by screws 59 which pass through the plate and are threaded into the body. The plate 57 is formed on its upper face with five detent sockets 61 with which the spring urged ball detent 62 coacts (see Fig. 1). This detent is housed in a cavity in the valve cap 63 which overlies the plate 57 and has a peripheral depending flange encircling that plate. An oil retaining ring 64 is interposed between the cap and the annulus as shown.

The cap 63 is connected with the valve 43 by four screws 65, which pass through the cap and are threaded into the upper end of the valve 43. Alignment is assured by lugs 66 which project from the upper end of the valve 43 (see Figs. 8 and 9) and engage notches of a hub portion 67 on a lower face of the cap 63. This hub portion is annular in form and seats on the top of the valve 43 (see Figs. 1 and 3).

A radially extending shaft 68 is swiveled in the cap 63 and carries an eccentric disc 69 which works in a clearance cavity formed in the cap to receive it. This eccentric is fixed to the shaft by a staking screw 71 so that the eccentric and the shaft turn together. The handle 72, by which the cap 63 and the valve 43 are rotated, is mounted on and pinned to the projecting end of the shaft 68.

Twisting the handle 72 to rotate the shaft 68 swings the eccentric or cam 69 and since this engages the upper end of an inverted cup-like spring seat 73 the effect is to force the spring seat downward and compress the spring 74. The lower end of the spring 74 rests on a flange of the spring seat 75 which is mounted on the upper end of the balanced piston valve 76. This is simply a cylindrical valve with a reduced middle portion, and is slidable vertically in the axial bore 46 of the rotary valve 43. The reduced middle portion always communicates with the supply port 55 which is always in communication with the supply chamber 22.

The valve 76 is biased upward by coil compression spring 77 which is mounted in the bore beneath the valve and confined by the plug 78, which is screwed into the lower end of the bore. When the eccentric 69 is in its upper position (Fig. 3) the valve 76 is moved to its uppermost position by the spring 77. Its lower end then exposes the exhaust port 45 which is always in communication with the sump. The brake cylinder ports 53, 54 are always in communication by way of groove 52, port 33 and groove 32 with the brake cylinder chamber 25. This is so regardless of the angular position of the rotary valve 43.

If the handle 72 is twisted to load the spring 74, the valve 76 will be forced downward closing the exhaust port 45 and connecting port 55 with brake cylinder port 53 by way of the reduced portion of the valve 76. Pressure in the brake cylinder port will then rise until the pressure acting on the lower end of the valve 76 plus the load on the spring 77 balances the load on the spring 74. When this occurs, the valve 76 will move to lap position, that is, a position in which it disconnects ports 22 and 53 and blanks exhaust port 45. It will be understood without further explanation that for each position to which the cam 69 may be rotated, there is a corresponding pressure in the brake cylinder connection 25 so that the brake can be graduated on and off by simply twisting the handle 72. The brake is under control in all positions which the rotary valve 43 may occupy.

Figure 2:
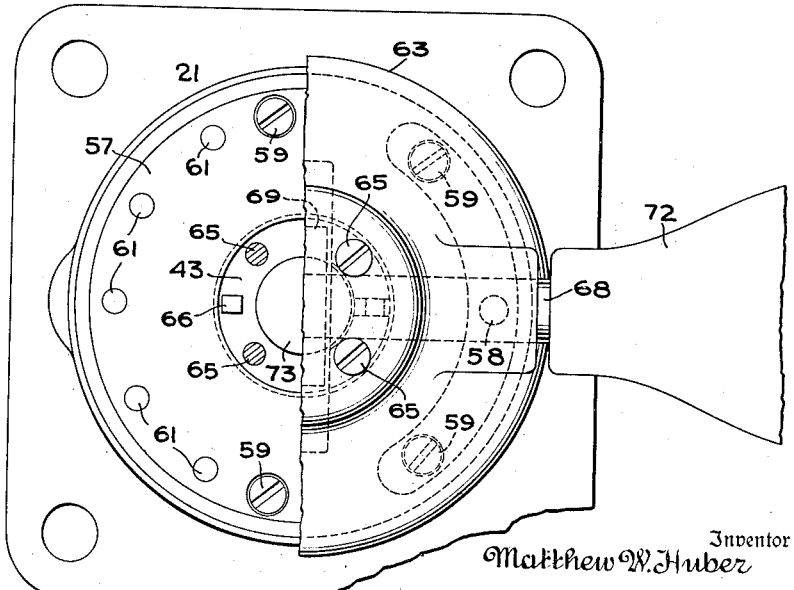
Fig. 2 is a plan view of the valve in the position stated, the left hand portion of the cap plate being broken away to illustrate the internal construction.
Figure 6:
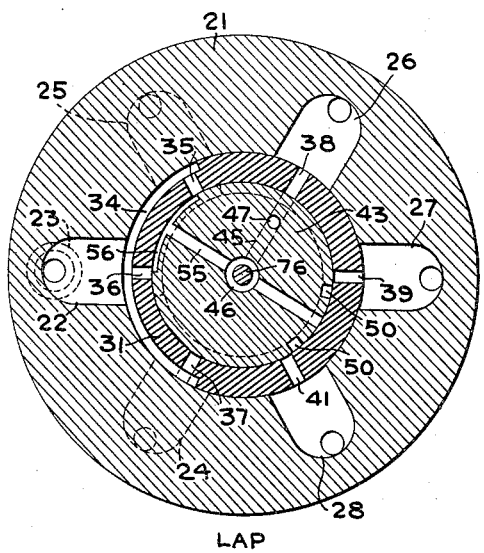
Fig. 6 is a similar view showing a lap position, the one illustrated being between the setting for low speed and reverse. There is a similar lap position between low speed and high speed positions.
Figure 7:
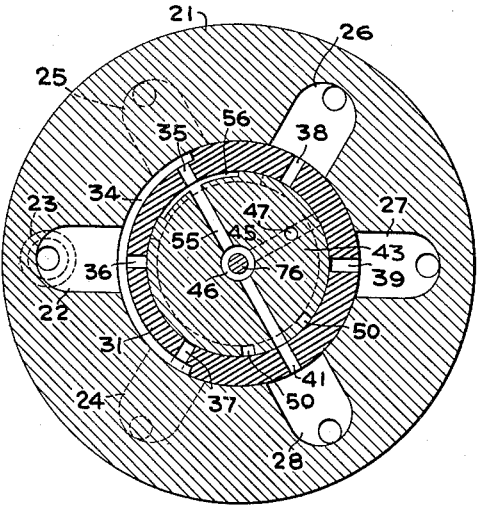
Fig. 7 is a similar view showing the valve set to put the reverse connection under pressure.
Figure 8:
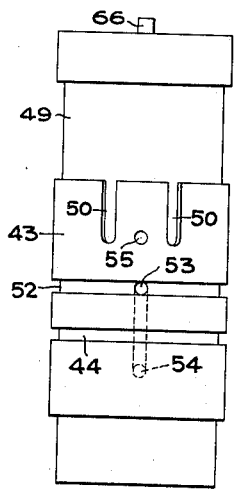
Figs. 8 and 9 are elevations of the opposite sides of the rotary distributing valve.

The first, third and fifth of the five positions defined by the five recesses 61 of Fig. 2 correspond to three equally spaced positions in which the supply chamber 22 is connected respectively with the high speed chamber 26, the low speed chamber 27 (Fig. 4) and the reverse chamber 28 (see Fig. 7). The two remaining intermediate positions are lap positions, one of which is indicated in Fig. 6 as intermediate the low speed and reverse position, and the other of which is displaced therefrom 60° counterclockwise so as to be intermediate high and low speed positions.

Observe that in Fig. 6 the two exhaust ports 50 are isolated from the low speed port 39 and the reverse port 41 but that motion in opposite directions from the position of Fig. 6 would cause venting of one or another of these ports. These exhaust positions are not maintained by the detent 62.

It will be observed that in moving from a position in communication with any one of the ports 26, 27 or 28 to a position of communication with another one of said ports, the valve must pass through an exhaust position for the port which has been placed under pressure.

It is believed that the operation of the device will be readily understood. The valve 43 may be turned to its various functional positions without requiring operation of the self-lapping valve and the self-lapping valve may be operated independently of the rotary selector valve. Or, the self-lapping valve can be operated to develop and maintain any desired braking pressure as an incident to the shift of the selector valve.

The operator soon learns to manipulate the valve with one hand and to coordinate the braking action with the shift.

As stated, the valve may be used for various purposes, other than the one particularly mentioned and the mode of operation can be modified to suit the requirements of any installation.

The single embodiment here described in considerable detail is to be taken as illustrative. No limitations beyond those specifically expressed in the claims are implied.

I claim:

1. The combination of a housing provided with a cylindrical valve seat having a pressure supply port, a sump port, at least one controlled port adapted for connection with a device to be controlled, and a brake cylinder port; a rotatable valve mounted in said cylindrical seat and so ported that rotation of the valve to selected positions serves to connect the controlled port with the supply port or with the sump port or to interrupt the connections aforesaid; a cylindrical valve seat in said valve, said seat having ports constantly in communication with the supply port, the brake cylinder port and the sump port; a piston valve in the second named cylindrical seat subject at one end to pressure in the brake cylinder port and having an application position in which it connects the supply port with the brake cylinder port, a release position toward which it is urged by brake cylinder port pressure reacting on the end of the valve and in which it connects the brake cylinder and sump ports, and an intermediate lap position in which such communications are interrupted; yielding means which when stressed urge the piston valve toward its application position; and an actuator capable of two distinct motions, one of which rotates said rotary valve, and the other of which variably stresses said yielding means.

2. The combination defined in claim 1 in which there are at least two controlled ports, and the rotary valve has a lap and two release positions intermediate the positions in which it connects the supply port with respective controlled ports, one release position connecting one controlled port, and the other connecting the other controlled port, with the sump port.

3. The combination of a housing provided with a cylindrical valve seat having a pressure supply port, a sump port, at least one controlled port adapted for connection with a device to be controlled, and a brake cylinder port; a rotatable valve mounted in said cylindrical seat and so ported that rotation of the valve to selected positions serves to connect the controlled port with the supply port or with the sump port or to interrupt the connections aforesaid; a cylindrical valve seat in said valve, said seat having ports constantly in communication with the supply port, the brake cylinder port and the sump port; a piston valve in the second named cylindrical seat subject at one end to pressure in the brake cylinder port and having an application position in which it connects the supply port with the brake cylinder port, a release position toward which it is urged by brake cylinder port pressure reacting on the end of the valve and in which it connects the brake cylinder and sump ports, and an intermediate lap position in which such communications are interrupted; yielding means which when stressed urge the piston valve toward its application position; an actuator capable of two distinct motions, one of which rotates said rotary valve, and the other of which variably stresses said yielding means; means forming leakage collecting chambers within the housing at opposite ends of the rotary valve; and means connecting said chambers with the sump port.

4. The combination of a housing provided with a cylindrical valve seat having a pressure supply port, a sump port, at least one controlled port adapted for connection with a device to be controlled, and a brake cylinder port; a rotatable valve mounted in said cylindrical seat and so ported that rotation of the valve to selected positions serves to connect the controlled port with the supply port or with the sump port or to interrupt the connections aforesaid; a cylindrical valve seat in said valve, said seat having ports constantly in communication with the supply port, the brake cylinder port and the sump port; a piston valve in the second named cylindrical seat subject at one end to pressure in the brake cylinder port and having an application position in which it connects the supply port with the brake cylinder port, a release position toward which it is urged by brake cylinder port pressure reacting on the end of the valve and in which it connects the brake cylinder and sump ports, and an intermediate lap position in which such communications are interrupted; yielding means which when stressed urge the piston valve toward its application position; a cap rotatable on said housing and connected to turn with said rotary valve, said cap enclosing said yielding means; a handle extending approximately radially to the axis of the rotary valve and swiveled in said cap; and means for stressing said yielding means operable by rotation of the handle in the cap.

5. The combination of a rotary cylindrical valve having an axial cylindrical valve-seat formed therein, a transverse port intersecting said cylindrical valve seat, also a brake cylinder port and a sump port; means forming an encircling valve seat having a supply port so arranged as to communicate with one end of said transverse port in all functional positions of the rotary valve, controlled ports which selectively communicate with the other end of said transverse port in the various functional positions of the rotary valve, and a brake cylinder port and a sump port which communicate with the corresponding ports in the rotary valve; a piston valve working in said cylindrical valve seat and having a reduced portion which is always in communication with said transverse port, the piston valve being subject on opposite ends to pressures in the brake cylinder and sump ports and having an application position in which it connects the transverse port to the brake cylinder port, a release position in which it connects the brake cylinder and sump ports and an intermediate lap position; yielding means for loading said piston valve toward application position in opposition to brake cylinder pressure; and a single actuator having independent motions for rotating the rotary valve and for variably stressing said yielding means.

6. The combination of a rotary cylindrical valve having an axial cylindrical valve seat formed therein and closed at one end, a transverse port intersecting said cylindrical valve seat, also a brake cylinder port which communicates with the closed end of said cylindrical valve seat, and a sump port; means forming an encircling valve seat having a supply port so arranged as to communicate with one end of said transverse port in all functional positions of the rotary valve, controlled ports which selectively communicate in the other end of said transverse ports in the various functional positions of the rotary valve, and a brake cylinder port and a sump port which communicate with the corresponding ports in the rotary valve; means limiting said valve to rotary motion; means enclosing spaces at opposite ends of said rotary valve; means connecting said spaces with said sump port whereby the valve is in a balanced condition and leakage will be relieved; a piston valve working in said cylindrical valve seat and having a reduced portion which is always in commuication with said transverse port, the piston valve being subject on opposite ends to pressure in the brake cylinder port and to the sump pressure in one of said enclosed spaces at the end of said rotary valve, the piston valve having an application position in which it connects the transverse port with the brake cylinder port, a release position in which it connects the brake cylinder and sump ports and an intermediate lap position; yielding means for loading said piston valve toward application position in opposition to brake cylinder port pressure; and an actuator having independent motions for rotating the rotary valve and for variably stressing said yielding means.

MATTHEW W. HUBER.